നoഹ്ഹ്

2,805,231
1-HYDROXY-4-ANDROSTENE-3,17-DIONE AND ESTERS THEREOF

Raymond M. Dodson, Park Ridge, and Robert D. Muir, Deerfield, Ill., assignors to G. D. Searle & Co., Chicago, Ill., a corporation of Delaware No Drawing. Application June 6, 1956,
Serial No. 589,581

4 Claims. (Cl. 260—397.4)

The present invention relates to valuable oxygenated derivatives of androstenedione, and is particularly concerned with 1-hydroxy-4-androstene-3,17-dione and esters thereof. The compounds of the present invention can be represented by the general structural formula

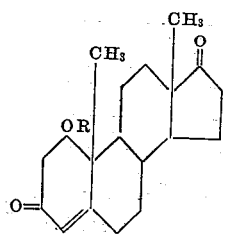

wherein R can be hydrogen or a lower alkanoyl radical. When R is a lower alkanoyl radical, it can represent such acyl groups as formyl, acetyl, propionyl, butyryl, valeryl, hexanoyl, heptanoyl, and octanoyl, said acyl groups being the alkanoyl radicals of alkanoic acids containing fewer than 9 carbon atoms.

1-hydroxy-4-androstene-3,17-dione can be obtained by subjecting 4-androstene-3,17-dione, under controlled conditions, to the oxygenating activity of a particular Penicillium organism isolated from a sample of Illinois soil.

A culture of this microorganism has been deposited with the American Type Culture Collection, Washington, D. C., and has been designated as *Penicillium sp.*, accession number 12,556. This organism is sometimes referred to hereinafter as ATCC 12,556.

In the manufacture of 1-hydroxy-4-androstene-3,17-dione, the selected strain of organism is cultured on a medium favorable to its propagation. Synthetic or partially synthetic liquid media are generally preferred, as such liquid media afford certain advantages. Incorporation of available carbon, nitrogen, minerals and accessory nutrient factors is facilitated by the use of a liquid medium. Use of a liquid culture medium affords additional advantages in permitting efficient aeration, intimate contact of the steroid substrate with the oxygenating enzymes of the fungus and conveniences in the isolation of the final product. Such a culture medium can incorporate a carbohydrate as a source of available carbon, and proteins, hydrolysis products of proteins, or inorganic nitrates or ammonium salts as a source of available nitrogen. Additional nutrient factors can be supplied by the incorporation of corn steep liquor into the medium. Mineral constituents and other accessory growth factors recognized in the prior art as being necessary or desirable for the growth of fungi are usually naturally present in the culture media described hereinafter. When synthetic media are employed which are deficient in minerals and other accessory growth factors, such constituents are added as required.

The sterilized culture medium is inoculated with *Penicillium sp.*, ATCC 12,556, and growth of the organism is allowed to proceed under aerobic conditions at a suitable temperature. Temperatures within the range of 20–30° C. have been found desirable for the propagation of Penicillium fungi although appreciable growth also takes place outside of these limits. Aeration of the liquid culture medium is conveniently accomplished by agitation such as is achieved by stirring or by use of a shaking platform, by blowing air through the culture medium, or by a combination of these means.

The exact time and manner of introducing the steroidal substrate to the oxygenating activity of the Penicillium organism or enzymes is a relatively non-critical factor and these operating details can be selected from within fairly wide limits. For example, the steroid can be added to the culture medium prior to sterilization, at the time of inoculation of the medium with the fungus, or after the fungus has been allowed to grow for a period of time, conveniently up to 48 hours. The steroid to be oxygenated can be added to the culture medium as a solid, a suspension, or a solution. A desirably fine state of dispersion of the steroid is achieved by adding it to the fermentation medium as a solution in a small amount of ethanol. Oxygenation of the steroid can be achieved by subjecting it to the action of the entire culture medium, or alternatively, with the use of procedures known to the prior art, by subjecting it to the action of the separated oxygenating enzymes, free of nutritional factors which are needed for the growth of the fungus.

Satisfactory yields of oxygenated product are obtained by allowing a contact time of, typically, 8 to 48 hours, although substantial conversion begins almost immediately after the addition of the steroid to the fermentation mixture. The minimum period of time required for a satisfactory degree of conversion of the steroid depends on various factors such as the stage of growth of the fungus at the time of the addition of the steroid, the temperature of fermentation, and the rate of aeration. In general, extensive growth of the fungus before the addition of the steroid substrate tends to lessen the contact time required for satisfactory oxygenation of the steroid. A period of fungal growth of 24 hours, followed by a steroid contact time of 24 hours, has been found to give generally good results when the fermentation is conducted substantially as described herein. At the conclusion of the fermentation period, the steroidal product, which can contain unreacted androstenedione as well as steroidal transformation products, is recovered by such means as extraction with methylene chloride, and is subjected to separation into individual components by such means as fractionation on a silica gel chromatography column. Depending upon specific conditions, there can be isolated a variety of transformation products. In representative examples as described herein, there is obtained as the principal transformation product 1α-hydroxy-4-androstene-3,17-dione, in addition to unconverted 4-androstene-3,17-dione and other new and novel oxygenation products such as 2β-hydroxy-4-androstene-3,17-dione.

The structure of 1α-hydroxy-4-androstene-3,17-dione is established by classical methods of structure determination. Included among such classical methods are the determination of the behavior of the compound under esterifying conditions, determination of its absorption spectra under various conditions, investigation of the products which result when the newly-introduced oxygenerated group is eliminated with the formation of an unsaturated linkage, and analysis of molecular rotatory differences.

Upon reaction of 1α-hydroxy-4-androstene-3,17-dione with acylating agents such as lower alkanoic acid anhydrides and lower alkanoyl halides, suitably in pyridine solution, the 1α-alkanoyloxy-4-androstene-3,17-diones of this invention result.

The compounds of the present invention have useful pharmacological properties. In addition they are valuable chemical intermediates, as they afford an unusually smooth route, heretofore unknown, for the manufacture of steroids having an aromatic ring A. It is well known in the art that processes and intermediates which can be employed in the conversion of androstane derivatives to estrane derivatives are of great value. Such a transformation can be achieved by the sequence of steps which comprises brominating and debrominating androstane-3,17-dione, followed by pyrolyzing the resulting 1,4-androstadiene-3,17-dione to estrone. With the compositions of the present invention, estrone can be manufactured from compounds of the androstane series without the use of the inefficient and difficult bromination and debromination steps. As described hereinafter, 1α-hydroxy-4-androstene-3,17-dione and its esters are directly converted into estrone by pyrolysis.

The epimeric compounds, 1β-hydroxy-4-androstene-3,17-dione and the 1β-alkanoyloxy-4-androstene-3,17-diones will also afford estrone upon pyrolysis and are therefore equivalents of the compounds specifically described herein.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials, except as otherwise noted, in parts by weight.

EXAMPLE 1

A stainless steel fermentation tank having a capacity of about 40 liters is charged with a solution of 1000 grams of dextrose, 200 grams of a commercial enzymatic digest of lactalbumin, 90 milliliters of corn steep liquor and 15 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of about 110° C. and a final volume of about 30 liters. The contents of the fermentor are cooled and inoculated with a spore suspension of Penicillium sp., ATCC 12,556. The contents of the fermentor are kept agitated by a stirrer operating at about 200–300 revolutions per minute. A stream of air which has been sterilized by filtration through a glass wool filter is introduced through an inlet tube into the fermentor at a rate of from 15 to 22 liters of air per minute. This rate of aeration is measured by means of a rotameter placed in the sterile portion of the air line. Growth of the organism is allowed to continue for 24 hours at about 25° C., during which time the pH of the fermentation medium drops from about 4.5 to 3.6. During the 24 hour period of growth of the organism, additional small portions of anti-foaming agent are added as required. A solution of 10 grams of 4-androstene-3,17-dione in 750 milliliters of ethanol is added and fermentation in the presence of the steroid substrate is continued for an additional 24 hours at 25° C., with the same rates of stirring and aeration. The contents of the fermentor are stirred for 1 hour with 18 liters of methylene chloride. The mycelium is then separated by filtration and washed with about twice its volume of methylene chloride. The aqueous broth collected as a filtrate in the separation of the mycelium is stirred for an additional hour with a fresh portion of methylene chloride. The combined methylene chloride extracts, amounting to a total volume of about 40 liters, are concentrated under reduced pressure to a volume of about 750 milliliters. This concentrate is washed with water and evaporated to dryness under reduced pressure. The residue is extracted with 100 milliliters of methanol; decolorizing carbon is added and the solution is filtered from insoluble silicone. The filtrate is evaporated to dryness, and a solution of the residue in benzene is fractionated on a chromatography column prepared from 1000 grams of silica. The column is developed with 1 liter portions of solvents. Results of a representative fractionation are given in Table I and in the text which follows. It will be obvious to anyone possessing ordinary skill in chromatographic separations that the absolute positions of elution from the column are subject to variations in different runs, and that residues from successive eluates are combined for purification on the basis of evidence of substantial homogeneity, such as is afforded by a showing that successive residues have identical or similar melting points.

*Table I*

| Fractions | Solvent, Volume Percent Ethyl Acetate in Benzene | Eluate Solids, Milligrams |
| --- | --- | --- |
| 1–2 | 100% Benzene | 167 |
| 3–8 | 5 | 373 |
| 9–20 | 10 | 981 |
| 21–24 | 15 | 73 |
| 25–30 | 20 | 307 |
| 31–33 | 25 | 208 |
| 34 | 25 | 172 |
| 35–36 | 30 | 215 |
| 37–40 | 30 | 128 |
| 41–48 | 35 | 450 |
| 49 | 40 | 122 |
| 50–59 | 40 | 2,826 |
| 60–62 | 40 | 319 |
| 63–64 | 50 | 176 |
| 65–68 | 60 | 392 |

Crystalline residues from fractions 25 through 30, afford unconverted 4-androstene-3,17-dione upon purification. The crystalline residues from fractions 34 through 36, when crystallized from a mixture of acetone and cyclohexane, melt in the range of 132–140° C. Upon further purification by crystallization from aqueous acetone and again from a mixture of acetone and cyclohexane, they afford 2β-hydroxy-4-androstene-3,17-dione melting at about 143–145° C. This compound has a specific rotation of about −37° in chloroform solution, and an ultraviolet absorption maximum at 242 millimicrons with a molecular extinction coefficient of about 14,200.

Other crystalline products appear at various places in the elution sequence. The principal product of the fermentation appears in the crystalline residues of fractions 50 through 59. Crystalline residues from these eluates melt in the range of about 190–200° C.; they are combined and purified by crystallizations from mixtures of acetone and cyclohexane and from aqueous methanol. In this manner there is obtained 1α-hydroxy-4-androstene-3,17-dione melting at about 214.5–217° C. This compound exhibits a specific rotation of about +184° in chloroform solution, and has an ultraviolet absorption maximum at 240 millimicrons with a molecular extinction coefficient of about 15,000. It has the structural formula

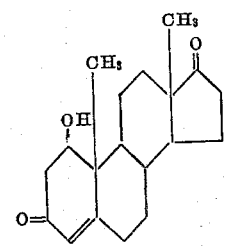

EXAMPLE 2

A stainless steel fermentation tank having a capacity of about 40 liters is charged with a solution of 1000 grams of dextrose, 200 grams of a cotton seed protein concentrate, 90 milliliters of corn steep liquor and 12 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of 110° C. and a final volume of about 30 liters. The contents of the fermentor are cooled and inoculated with a culture of *Penicillium sp.*, ATCC 12,556. The contents of the fermentor are kept agitated by a stirrer operating at about 200 revolutions per minute. A stream of air which has been sterilized by filtration through a glass wool filter is introduced through an inlet tube into the fermentor at a rate of from 15 to 22 liters of air per minute. This rate of aeration is measured by means of a rotameter placed in the sterile portion of the air line. Growth of the organism is allowed to continue for 30 hours at about 25° C. Additional small quantities of anti-foaming agent are added as required. There is then added a solution of 10 grams of 4-androstene-3,17-dione in 750 milliliters of ethanol, and fermentation in the presence of the steroid substrate is continued for an additional 14 hours at 25° C., with the same rates of stirring and aeration. The contents of the fermentor are stirred for 1 hour with 18 liters of methylene chloride. The mycelium is separated by filtration and washed with about twice its volume of methylene chloride. The aqueous broth collected as a filtrate in the separation of the mycelium is stirred for an additional hour with a fresh portion of methylene chloride. The combined methylene chloride extracts, amounting to a total volume of about 40 liters, are concentrated under reduced pressure to a volume of about 500 milliliters. This concentrate is washed with water and evaporated to dryness under reduced pressure.

The non-volatile residue, which consists of about 30 grams, is extracted with 100 milliliters of methanol. The resulting solution is filtered from any undissolved silicone which may be present and decolorized with activated carbon. Upon filtration and concentration of the filtrate, there is obtained about 18 grams of non-volatile residue. This residue is washed thoroughly with 100 milliliters of hot water and with 100 milliliters of petroleum ether and the fraction which remains undissolved (about 7 grams) is dissolved in benzene solution and fractionated on a silica gel chromatography column by elution of the column with mixtures of ethyl acetate and benzene containing gradually increasing proportions of ethyl acetate. There is thus obtained as the principal steroidal transformation product 1α-hydroxy-4-androstene-3,17-dione which, after purification, is identical with the product of Example 1.

EXAMPLE 3

A solution of 5 parts of 1α-hydroxy-4-androstene-3,17-dione, 100 parts of pyridine and 100 parts of acetic anhydride is allowed to stand at about 25° C. for 20 hours. The solution is concentrated to dryness by such means as vaporization of the solvents in a stream of nitrogen or distillation of the solvents under reduced pressure to avoid excessively high temperatures. The residue is crystallized from aqueous methanol and then from aqueous acetone, whereby there is obtained 1α-acetoxy-4-androstene-3,17-dione melting at about 112.5–113.5° C. This compound has a specific rotation of about +192° in chloroform solution, and an ultraviolet absorption maximum at 239.5 millimicrons with a molecular extinction coefficient of about 16,500. The structural formula is

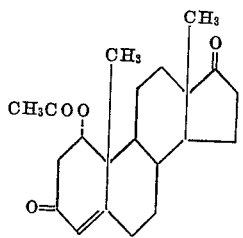

EXAMPLE 4

A solution of 3 parts of 1α-hydroxy-4-androstene-3,17-dione, 20 parts of pyridine and 20 parts of acetic anhydride is allowed to stand for 20 hours at about 25° C., after which the mixture is diluted with several times its volume of water. The precipitated product is collected and crystallized from dilute methanol, whereby there is obtained 1α-acetoxy-4-androstene-3,17-dione, identical with the product of Example 3.

EXAMPLE 5

A solution of 2 parts of 1α-hydroxy-4-androstene-3,17-dione, 40 parts of pyridine and 10 parts of butyric anhydride is allowed to stand at about 25° C. for 48 hours. The mixture is diluted with several times its volume of water, and when precipitation of the reaction product is complete, it is collected and washed with water. By crystallization from aqueous methanol there is obtained 1α-butyroxy-4-androstene-3,17-dione which has an ultraviolet absorption maximum at 240 millimicrons with a molecular extinction coefficient of about 16,600. This compound has the structural formula

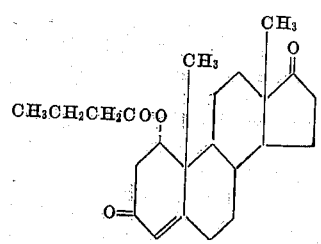

EXAMPLE 6

A solution of 1 part of 1α-acetoxy-4-androstene-3,17-dione in 450 parts of a 60 volume percent solution of methanol in water is treated with a small quantity of aqueous sodium hydroxide solution containing 1 part of sodium hydroxide. The mixture is allowed to stand in a nitrogen atmosphere at about 25° C. for 4 hours, after which it is stirred with 450 parts of ethyl acetate. The aqueous phase is extracted with additional small portions of ethyl acetate, and the combined ethyl acetate solution is washed with small portions of water and concentrated to dryness. By crystallization of the residue from a mixture of acetone and cyclohexane, there is obtained 1,4-androstadiene-3,17-dione melting at about 140° C.

EXAMPLE 7

A solution of 5 parts of 2β-hydroxy-4-androstene-3,17-dione, 100 parts of pyridine and 100 parts of acetic anhydride is allowed to stand for 2 hours at about 25° C., and is then diluted with several times its volume of ice water. The separated product is collected and crystallized from dilute acetone, to afford 2β-acetoxy-4-androstene-3,17-dione melting at about 157–158° C. This compound has an ultraviolet absorption maximum at 243 millimicrons with a molecular extinction coefficient of about 15,300, and a specific rotation of about −6° in chloroform solution.

The epimerized ester is obtained as follows. A solution of 4 parts of 2β-acetoxy-4-androstene-3,17-dione in 1000 parts of acetic acid is mixed with 200 parts of anhydrous potassium acetate and heated under reflux for 4 hours. The mixture is concentrated to a very small volume under reduced pressure, diluted with water, and extracted with several portions of ether. The ethereal solution is washed with water, with dilute sodium carbonate solution, with water, and is then evaporated to dryness. When the residue is crystallized from a mixture of acetone and cyclohexane and then from aqueous acetone, there is obtained 2α-acetoxy-4-androstene-3,17-dione melting at about 209–211° C. This compound has a specific rotation of about +147° in chloroform solution, and an ultraviolet absorption maximum at 239.5 millimicrons with a molecular extinction coefficient of about 15,500.

EXAMPLE 8

A solution of 5 parts of 1α-hydroxy-4-androstene-3,17-dione in 900 parts of mineral oil is preheated to 190–195° C. and passed in small portions through a tube constructed of non-reactive material and packed with chips of quartz or of a high-silica glass. The time and temperature of each pass is so regulated that each portion of the solution has a contact time of 2–5 seconds at a temperature of about 600–650° C. The cooled mixture which is obtained from this operation is diluted with 1400 parts of ether and extracted with several portions of 5% potassium hydroxide solution. The basic extract is washed with a small quantity of ether and then acidified with dilute hydrochloric acid, whereby there is obtained a precipitate of the crude product. This product is collected on a filter and crystallized from ethanol, whereby there is obtained purified estrone melting at about 260° C.

EXAMPLE 9

A solution of 3 parts of 1α-acetoxy-4-androstene-3,17-dione in 720 parts of mineral oil is preheated to about 135° C. and passed in small portions through a heated tube constructed of an inert material and packed with chips of quartz or of a high silica glass. The manner of operation is such that each portion of the solution is maintained in the heated zone at about 600–650° C. for 2–5 seconds. The mixture which flows from the heating tube is rapidly cooled, diluted with about twice its volume of ether and extracted with several portions of 5% potassium hydroxide solution. The alkaline extract is washed with a small quantity of ether and then poured into an excess of cold, dilute hydrochloric acid. When separation of the insoluble product is complete, it is collected on a filter and recrystallized from ethanol. There is thus obtained purified estrone melting at about 260° C.

What is claimed is:

1. A compound of the formula

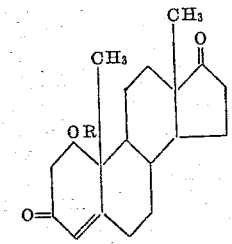

wherein R is a member of the class consisting of hydrogen and lower alkanoyl radicals.

2. 1α-hydroxy-4-androstene-3,17-dione.
3. 1α-(lower)alkanoyloxy-4-androstene-3,17-dione.
4. 1α-acetoxy-4-androstene-3,17-dione.

References Cited in the file of this patent

UNITED STATES PATENTS

| | | |
|---|---|---|
| 2,602,803 | Kaufmann | July 8, 1952 |
| 2,715,640 | Ralls | Aug. 16, 1955 |
| 2,737,518 | Herzog | Mar. 6, 1956 |
| 2,748,150 | Bergstrom | May 29, 1956 |